United States Patent
Furukawa et al.

(10) Patent No.: US 7,253,134 B2
(45) Date of Patent: Aug. 7, 2007

(54) SILICON CARBIDE-BASED CATALYTIC BODY AND PROCESS FOR PRODUCING THE SAME

(75) Inventors: Masahiro Furukawa, Nagoya (JP); Kenji Morimoto, Kasugai (JP); Shinji Kawasaki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 120 days.

(21) Appl. No.: 10/531,048

(22) PCT Filed: Oct. 15, 2003

(86) PCT No.: PCT/JP03/13189

§ 371 (c)(1),
(2), (4) Date: Apr. 12, 2005

(87) PCT Pub. No.: WO2004/035207

PCT Pub. Date: Apr. 29, 2004

(65) Prior Publication Data

US 2006/0003889 A1   Jan. 5, 2006

(30) Foreign Application Priority Data

Oct. 18, 2002   (JP)   ............................. 2002-303923

(51) Int. Cl.
*B01J 27/224*   (2006.01)
*C01B 31/30*   (2006.01)

(52) U.S. Cl. ...................... 502/178; 423/439
(58) Field of Classification Search ............... 502/178; 423/439

See application file for complete search history.

(56) References Cited

U.S. PATENT DOCUMENTS

| | | | | |
|---|---|---|---|---|
| 5,589,116 | A | * | 12/1996 | Kojima et al. ............... 264/628 |
| 6,649,563 | B2 | * | 11/2003 | Nakanishi et al. .......... 502/439 |
| 6,787,500 | B2 | * | 9/2004 | Ito et al. ...................... 502/180 |
| 7,011,803 | B2 | * | 3/2006 | Ichikawa et al. ........... 423/345 |
| 2002/0004455 | A1 | | 1/2002 | Nakanishi et al. |
| 2005/0169818 | A1 | * | 8/2005 | Ohno et al. ................. 422/177 |

FOREIGN PATENT DOCUMENTS

| | | | |
|---|---|---|---|
| EP | 1 078 678 A2 | | 2/2001 |
| JP | A 6-182228 | | 7/1994 |
| JP | 2002-059009 | * | 2/2002 |
| JP | 2002-201082 | * | 7/2002 |
| JP | A 2002-201082 | | 7/2002 |
| JP | A 2002-234779 | | 8/2002 |

* cited by examiner

*Primary Examiner*—J. A. Lorengo
*Assistant Examiner*—Patricia L. Hailey
(74) *Attorney, Agent, or Firm*—Oliff & Berridge, PLC

(57) ABSTRACT

The silicon carbide-based catalytic body of the present invention comprises:
a porous body of given shape comprising a first bonded structure formed by bonding a large number of silicon carbide particles as an aggregate to each other in a state that a large number of fine pores are present, and
a catalyst containing an alkali metal and/or an alkaline earth metal, loaded on the porous body, characterized in that the catalyst is loaded via a crystalline coating film comprising an oxide and formed on at least part of the surfaces of the silicon carbide particles forming the first bonded structure. In the catalytic body, the catalyst such as $NO_x$ occlusion catalyst or the like, loaded thereon can maintain its activity over a long period.

11 Claims, 1 Drawing Sheet

SILICON CARBIDE-BASED CATALYTIC BODY AND PROCESS FOR PRODUCING THE SAME

TECHNICAL FIELD

The present invention relates to a silicon carbide-based catalytic body having a catalyst loaded thereon, used for purification of automobile exhaust gas, as well as to a process for producing such a catalytic body.

BACKGROUND ART

A porous honeycomb structure constituted by cell partition walls (ribs) forming a plurality of cells adjacent to each other (a cell group) and an outer wall surrounding and holding the outermost cells present at the periphery of the cell group, is in wide use as a filter (a diesel particulate filter, DPF) for capturing and removing the particulate substance contained in a dust-containing fluid (e.g. an exhaust gas from diesel engine) or as a catalyst carrier for loading thereon a catalyst component which purifies the harmful substance contained in an exhaust gas; and refractory silicon carbide (SiC) is being used as a matrix material of the porous honeycomb structure.

As such a honeycomb structure, there is known, for example, a porous silicon carbide-based catalyst carrier of honeycomb structure which is obtained by using, as a starting material, an impurity-containing silicon carbide powder having a given specific surface area, forming the starting material into a given shape, drying the formed body, and firing the dried formed body in a temperature range of 1,600 to 2,200° C. (see, for example, JP-A-1994-182228).

In production of the above-mentioned porous silicon carbide-based catalyst carrier, the silicon carbide component vaporizes from the surfaces of the silicon carbide powder (particles) and condenses at the contacting areas (neck areas) of the particles; thereby, the neck areas grow and a bonded state is obtained in the sintering (necking) by recrystallization of the silicon carbide powder per se. However, the vaporization of silicon carbide requires a very high firing temperature, inviting a high cost, and the high-temperature firing of the material having high thermal expansion coefficient causes a reduction in firing yield, which have been a problem.

Further, when it is attempted to produce, by the sintering by recrystallization of the silicon carbide powder per se, a filter of high porosity, particularly a filter having a porosity of 50% or more, there has been a problem in that the sintering mechanism does not function sufficiently, thereby the growth of neck area is inhibited, consequently the filter produced has a low strength.

As a conventional technique for solving these problems, there were disclosed a porous honeycomb structure containing refractory particles as an aggregate, particularly silicon carbide and metallic silicon and a process for producing the porous honeycomb structure (see, for example, JP-A-2002-201082). However, this porous honeycomb structure has had a problem in that the structure, when loaded with, for example, an alkali metal (e.g. potassium, K) as an $NO_x$ occlusion catalyst or the like, shows a rapid deactivation of catalyst. This is a problem which tends to occur when a porous body containing silicon carbide as the main component is used as a catalyst carrier, regardless of the shape of the carrier.

DISCLOSURE OF THE INVENTION

The present invention has been made in view of the above-mentioned problems possessed by conventional techniques and aims at providing a silicon carbide-based catalytic body in which a catalyst such as $NO_x$ occlusion catalyst or the like can maintain its activity over a long period, and a process for producing such a catalytic body.

According to the present invention, there is provided a silicon carbide-based catalytic body comprising:

a porous body of given shape comprising a first bonded structure formed by bonding a large number of silicon carbide particles as an aggregate to each other in a state that a large number of fine pores are present; and a catalyst containing an alkali metal and/or an alkaline earth metal, loaded on the porous body, wherein the catalyst is loaded via a crystalline coating film comprising an oxide and formed on at least part of the surfaces of the silicon carbide particles forming the first bonded structure.

According to the present invention, there is also provided a silicon carbide-based catalytic body comprising:

a porous body of given shape comprising a second bonded structure formed by bonding a large number of silicon carbide particles as an aggregate and metallic silicon as a binder in a state that a large number of fine pores are present; and a catalyst containing an alkali metal and/or an alkaline earth metal, loaded on the porous body, wherein the catalyst is loaded via a crystalline coating film comprising an oxide and formed on at least part of the surfaces of the silicon carbide particles and/or the metallic silicon, forming the second bonded structure.

In the present invention, it is preferred that the crystalline coating film contains $SiO_2$ and further preferred that the crystalline coating film comprises cristobalite and/or mullite.

In the present invention, it is also preferred that the given shape is a honeycomb shape.

4. According to the present invention, there is also provided a process for producing a silicon carbide-based catalytic body, the process comprising:

forming a raw material mixture containing silicon carbide particles and metallic silicon into a formed body of a given shape;

calcinating and firing the formed body;

heat treating the formed body in an oxygen-containing atmosphere; and then loading, on the formed body, a catalyst containing an alkali metal and/or an alkaline earth metal, to obtain a catalytic body comprising:

a porous body comprising a second bonded structure formed by bonding a large number of the silicon carbide particles and the metallic silicon in a state that a large number of fine pores are present; and the catalyst loaded on the porous body via a crystalline coating film comprising an oxide and formed on at least part of the surfaces of the silicon carbide particles and/or the metallic silicon, forming the second bonded structure.

In the present invention, the heat treatment is conducted preferably at a temperature of 800 to 1,400° C. and the given shape is preferably a honeycomb shape.

BEST MODE FOR CARRYING OUT THE INVENTION

Figure 1:
FIG. 1 is an electron micrograph showing the microstructure (before catalyst loading) of the silicon carbide-based catalytic body of Example 1.

The present inventors found that the phenomenon that a catalyst [e.g. potassium (K)] loaded on a porous honeycomb structure containing silicon carbide and metallic silicon tends to be deactivated, occurs because the catalyst is easily absorbed by and diffused in the amorphous silica ($SiO_2$) phase formed at the time of firing and heating of the porous honeycomb structure which is a catalyst carrier. Therefore, it is considered that modification of the amorphous silica ($SiO_2$) phase can achieve a longer life of catalyst, and the present invention has been made.

The embodiments of the present invention are described below. However, the present invention is not restricted to the following embodiments and it should be construed that design change, improvement, etc. can be made appropriately based on the ordinary knowledge of those skilled in the art without departing from the spirit of the present invention.

The first embodiment of the present invention is a silicon carbide-based catalytic body which comprises:

a porous body of given shape which is constituted by a first bonded structure formed by bonding a large number of silicon carbide particles as an aggregate to each other in a state that a large number of fine pores are present, and a catalyst containing an alkali metal and/or an alkaline earth metal, loaded on the porous body, characterized in that the catalyst is loaded via a crystalline coating film composed of an oxide and formed on at least part of the surfaces of the silicon carbide particles forming the first bonded structure. The first invention is described in detail below.

The silicon carbide-based catalytic body of the present embodiment comprises a first bonded structure formed by bonding a large number of silicon carbide particles as an aggregate in a state that a large number of fine pores are present in the structure. Therefore, the present catalytic body reflects the properties of silicon carbide which is a constituent, and is superior in properties such as oxidation resistance, heat resistance and the like.

In the silicon carbide-based catalytic body of the present embodiment, at least part of the surfaces of the silicon carbide particles forming the first bonded structure constituting the catalytic body, i.e. at least part of the surfaces of the silicon carbide particles contacting with the loaded catalyst containing an alkali metal and/or an alkaline earth metal is covered with a crystalline coating film comprising an oxide. This crystalline coating film comprising an oxide is a coating film formed in place of the amorphous silica ($SiO_2$) phase which has been formed on the surfaces of the silicon carbide particles in a conventional silicon carbide-based porous body. In the silicon carbide-based catalytic body of the present embodiment, in which a catalyst containing an alkali metal and/or an alkaline earth metal is loaded via this crystalline coating film, the loaded catalyst is hardly absorbed and diffused and has a longer life.

Next, description is made on the second embodiment of the present invention. The second embodiment of the present invention is a silicon carbide-based catalytic body which comprises:

a porous body of given shape which is constituted by a second bonded structure formed by bonding a large number of silicon carbide particles as an aggregate and metallic silicon as a binder in a state that a large number of fine pores are present, and a catalyst containing an alkali metal and/or an alkaline earth metal, loaded on the porous body, characterized in that the catalyst is loaded via a crystalline coating film composed of an oxide and formed on at least part of the surfaces of the silicon carbide particles and/or the metallic silicon, all forming the second bonded structure. The second embodiment is described in detail below.

The silicon carbide-based catalytic body of the present embodiment comprises a second bonded structure formed by bonding silicon carbide particles as an aggregate and metallic silicon as a binder in a state that a large number of fine pores are present in the structure. Therefore, in production of the present catalytic body, sintering at a relatively low firing temperature is possible, the production cost is low, and the yield is high. Further, since metallic silicon is used for bonding silicon carbide particles which are refractory particles, the present catalytic body has a high thermal conductivity. Therefore, when the present catalytic body is used, for example, as a DPF and when the particulate matter deposited thereon is burnt for regeneration of the filter, there hardly appears a local temperature increase which damages the filter. The present catalytic body is also superior in properties such as oxidation resistance, heat resistance and the like.

In the silicon carbide-based catalytic body of the present embodiment, at least part of the surfaces of the silicon carbide particles and the metallic silicon, forming the second bonded structure constituting the catalytic body, i.e. at least part of the surfaces of the silicon carbide particles and the metallic silicon, contacting with the loaded catalyst containing an alkali metal and/or an alkaline earth metal is covered with a crystalline coating film comprising an oxide. This crystalline coating film comprising an oxide is a coating film formed in place of the amorphous silica ($SiO_2$) phase which has been formed on the surfaces of the silicon carbide particles and/or metallic silicon in a conventional silicon carbide-based porous body. In the silicon carbide-based catalytic body of the present embodiment, in which a catalyst containing an alkali metal and/or an alkaline earth metal is loaded via this crystalline coating film, the loaded catalyst is hardly absorbed and diffused and has a longer life.

Incidentally, in the first and second embodiments of the present invention, "at least part of the surfaces of the silicon carbide particles" and "at least part of the surfaces of the silicon carbide particles and the metallic silicon" mean that the surfaces of the silicon carbide particles and/or the metallic silicon may have areas not covered with the crystalline coating film. However, it is especially preferred that all of the surfaces of the silicon carbide particles and/or the metallic silicon, which are in contact with the loaded catalyst containing an alkali metal and/or an alkaline earth metal, are covered with the crystalline coating film.

In the first and second embodiments of the present invention, the crystalline coating film comprising an oxide is preferred to contain silica ($SiO_2$) and more specifically be composed of cristobalite and or mullite. The crystalline coating film composed of these compounds is preferred because a catalyst can be carried on it stably for a longer period and can be formed easily.

In the first and second embodiments of the present invention, it is also preferred that the porous body has a honeycomb shape (i.e. a honeycomb structure). The reason is that such a shape reflects the properties of the silicon carbide (constituent)-based porous body, shows superior properties in oxidation resistance, heat resistance, etc., and can be used under a high SV (space velocity) condition as a catalyst carrier.

As the kind of the alkali metal and/or alkaline earth metal contained in the catalyst used in the present embodiments, there can be mentioned, for example, K, Li, Na and Cs (alkali metals) and Ca, Ba and Sr (alkaline earth metals). In the catalyst, there may also be contained ordinarily, as a catalyst component, a noble metal such as Pt, Pd, Rh or the like, besides a $NO_x$ occlusion component (an alkali metal or an alkaline earth metal). Such a noble metal allows the No present in exhaust gas to react with $O_2$ to generate $NO_2$, prior to $NO_x$ occlusion by alkali metal or alkaline earth metal and, when the occluded $NO_x$ has been released, allows the released $NO_x$ to react with combustible components present in the exhaust gas to make the combustible components harmless. As the matrix material of the catalyst, there is preferably used a heat-resistant inorganic oxide having large specific surface area, such as $\gamma$-$Al_2O_3$ or the like, for loading the above-mentioned $NO_x$ occlusion component and noble metal in a highly dispersed state.

In order to load the catalyst containing an alkali metal and/or an alkaline earth metal, via the crystalline coating film, there may be used a general method of catalyst loading, employed in loading a catalyst on a honeycomb structure. Incidentally, the method for producing a honeycomb structure (a silicon carbide-based catalytic body) is described below.

Then, the third embodiment of the present invention is described. The third embodiment of the present invention is a process for producing a silicon carbide-based catalytic body, which comprises:

forming a raw material mixture containing silicon carbide particles and metallic silicon, into a given shape, calcinating and firing the formed body, followed by heat treatment in an oxygen-containing atmosphere, then loading, on the resulting body, a catalyst containing an alkali metal and/or an alkaline earth metal, to obtain a catalytic body (a silicon carbide-based catalytic body according to the second embodiment of the present invention). The catalyst comprises a porous constituted by a second bonded structure formed by bonding a large number of the silicon carbide particles and the metallic silicon in a state that a large number of fine pores are present, and the catalyst loaded on the porous body via a crystalline coating film comprising an oxide and formed on at least part of the surfaces of the silicon carbide particles and/or the metallic silicon, forming the second bonded structure. The third embodiment is described in detail below.

In producing the silicon carbide-based porous body, first, a raw material mixture containing silicon carbide particles and metallic silicon is prepared. To this raw material mixture may be added, as necessary, a forming aid such as organic binder or the like. The silicon carbide particles and the metallic silicon may contain a very small amount of impurities such as Fe, Al, Ca and the like; however, they may be used per se or may be used after purification by chemical treatment such as washing with chemical agent. The raw material mixture is kneaded to obtain a clay for forming.

The clay is formed into a given shape such as honeycomb shape or the like. The formed body is calcinated to remove the organic binder present therein (degreasing) to obtain a calcinated body. The calcination is conducted preferably at a temperature lower than the temperature at which metallic silicon melts. Specifically, the calcination may be conducted by holding the calcination temperature once at a given level of about 150 to 700° C., or may be conducted by using a small temperature elevation rate of 50° C./hr or less in a given temperature range. When the calcination temperature is held once at a given level, holding may be made at one temperature level or at a plurality of temperature levels depending upon the kind and amount of the organic binder used; when holding is made at a plurality of temperature levels, holding of each temperature level may be the same or different. When a small temperature elevation rate is used, such a temperature elevation rate may be used only in one temperature range or in a plurality of temperature ranges; when the small temperature elevation rate is used in a plurality of temperature ranges, the temperature elevation rate of each range may be the same or different.

The calcinated body is fired, whereby a fired body can be obtained. The fired body is constituted by the second bonded structure formed by bonding a large number of silicon carbide particles (which is a raw material and an aggregate) and metallic silicon (which is a binder) in a state that fine pores are present. In order to form this second bonded structure, it is necessary that the metallic silicon is softened during the firing. Since the melting point of the metallic silicon is 1,410° C., the firing is conducted preferably at a temperature of 1,410° C. or higher. The optimum firing temperature is determined by the intended microstructure and properties of the fired body to be obtained. With a firing temperature exceeding 1,600° C., vaporization of the metallic silicon proceeds, making difficult the bonding of silicon carbide particles via the metallic silicon; therefore, the firing temperature is appropriately 1,410 to 1,600° C., preferably 1,420 to 1,580° C.

Then, the fired body is heat-treated in an oxygen-containing atmosphere. By conducting this heat treatment, it is possible to cover at least part of the surfaces of the silicon carbide particles and/or the metallic silicon, which form the second bonded structure constituting the fired body, with a crystalline coating film comprising an oxide, for example, a coating film containing $SiO_2$, specifically a coating film composed of cristobalite and/or mullite, whereby a silicon carbide-based porous body (which later becomes a catalyst carrier) can be obtained.

Incidentally, the heat treatment in an oxygen-containing atmosphere is conducted preferably at 800 to 1,400° C., more preferably at 1,100 to 1,350° C. When the temperature is lower than 800° C., the degree of crystallinity of the crystalline coating film is insufficient; a temperature of higher than 1,400° C. is not preferred because it is near the melting point of metallic silicon, possibly having difficulty in keeping the given shape.

Then, the porous body is loaded with a catalyst. As the matrix material of the catalyst, a heat-resistant inorganic oxide of large specific surface area, such as $\gamma$-$Al_2O_3$ or the like is preferably used because it can carry the above-mentioned $NO_x$ occlusion component and noble metal in a highly dispersed state. Incidentally, the specific example of the method for loading a catalyst is described later.

The present invention is described specifically below by way of Examples. However, the present invention is in no way restricted to these Examples.

EXAMPLES 1 AND 2, COMPARATIVE EXAMPLES 1 AND 2

A SiC raw material powder having an average particle diameter of 47 μm and a Si powder having an average particle diameter of 5 μm were compounded in a mass ratio of 80:20. To 100 parts by mass of the resulting powder mixture were added 6 parts by mass of methyl cellulose as an organic binder, 2.5 parts by mass of a surfactant and 24 parts by mass of water, followed by uniform mixing and kneading, to obtain a clay for forming. The clay was formed by an extruder into a honeycomb shape of 45 mm in outer diameter, 120 mm in length, 0.43 mm in partition wall thickness and 100 cells/in.$^2$ (16 cells/cm$^2$) in cell density. The formed body was then calcinated for degreasing at 500° C. for 5 hours and then fired at 1,450° C. for 2 hours in a non-oxidizing atmosphere to obtain a fired body.

The fired body was heat-treated under the conditions shown in Table 1 (no heat treatment was made in Comparative Example 1) to produce a silicon carbide-based porous body having a honeycomb structure. The covered state of the porous body with a (crystalline) coating film was observed using an electron microscope and evaluated. The results are shown in Table 1. Incidentally, the evaluation was made based on the following standard. A case in which the surfaces of the silicon carbide (SiC) particles and metallic silicon (Si) constituting the surface of a porous body to later contact with a catalyst had been covered sufficiently, was rated as ⊚; a case in which the above surfaces had been covered to some extent (about 50%), was rated as ○; and a case in which the above surfaces had not been covered, was rated as X.

Figure 2:
FIG. 2 is an electron micrograph showing the microstructure (before catalyst loading) of the silicon carbide-based catalytic body of Comparative Example 1.

The crystal structure of the coating film observed above by an electron microscope was examined by X-ray diffraction. The results are shown in Table 1. Further, each porous body (honeycomb structure) was loaded with potassium (K) as a catalyst component (a NO$_x$ occlusion component) according to the method mentioned later, to produce silicon carbide-based catalytic bodies (Examples 1 and 2, Comparative Examples 1 and 2). The electron micrographs showing the microstructures (before catalyst loading) of the silicon carbide-based catalytic bodies of Example 1 and Comparative Example 1 are shown in FIGS. 1 and 2.

(Preparation of Catalyst Raw Material and Production of Catalytic Bodies)

A commercial γ-Al$_2$O$_3$ powder (specific surface area: 200 m$^2$/g) was immersed in a mixed solution of an aqueous (NH$_3$)$_2$Pt(NO$_2$)$_2$ solution and an aqueous KNO$_3$ solution. They were stirred in a pot mill for 2 hours; then, the water was distilled to dryness. After dry grinding of the residue, it was fired in an electric furnace at 600° C. for 3 hours to obtain a (platinum+potassium)-containing γ-alumina powder [(Pt+K)-predoped γ-Al$_2$O$_3$]. To this powder were added a commercial Al$_2$O$_3$ sol and water, and wet grinding of the mixture was carried out in a pot mill to prepare a catalyst raw material (a slurry for wash coat). The ratio of γ-Al$_2$O$_3$ to platinum (Pt) and potassium (K) was adjusted in the stage of immersion so that when the amount of the potassium (K) catalyst loaded was 100 g per liter of honeycomb structure, the amount (mass) of platinum (Pt) became 30 g per cft of honeycomb structure (1.06 g per liter of honeycomb structure) and the amount (mass) of potassium (K) became 20 g per liter of honeycomb structure after final firing through wash coat of slurry to the honeycomb structure. The addition amount of the Al$_2$O$_3$ sol was 5% by mass of the total Al$_2$O$_3$, in terms of Al$_2$O$_3$. The water was added appropriately so that the slurry had a viscosity allowing easy wash coating.

In the slurry for wash coat was immersed the above-produced honeycomb structure as a catalyst carrier; the superfluous solution in the cells of the honeycomb structure were removed by blowing; then, the coated honeycomb structure was dried. Adjustment was made so that the amount (mass) of loaded potassium (K) after firing became 20 g per liter of catalyst carrier. When the intended loading amount was not achieved after one time of immersion and drying, the steps of immersion and drying were repeated until the intended loading amount was reached. The potassium (K)-loaded body was fired in an electric furnace at 600° C. for 1 hour to obtain each silicon carbide-based catalytic body.

(Evaluation of Suppressability of Potassium (K) Diffusion)

Each silicon carbide-based catalytic body was subjected to an accelerated durability test in which the catalytic body was held at 850° C. for 30 hours with 10% by volume of water being allowed to be present. Before and after the test, the degree of dispersion (suppressability of diffusion) of potassium (K) was evaluated using the distribution of potassium (K) concentration (EDS map) measured by an energy dispersion spectroscopy. The results are shown in Table 1. Incidentally, the evaluation was made based on the degrees of diffusion of potassium before and after the accelerated durability test. A case in which there was substantially no potassium (K) diffusion and the distribution was about the same as before the test, was rated as A; a case in which there was slight diffusion of potassium (K), was rated as B; a case in which potassium (K) remained slightly at the original positions but diffused substantially, was rated as C; and a case in which potassium (K) did not remain substantially on the original positions, was rated as D. The results are shown in Table 1.

TABLE 1

| | SiC/Si (mass ratio) | Heat treatment Temp. (° C.) | Heat treatment Time (h) | Condition of covering | Crystalline coating film | Suppressability of potassium (K) diffusion |
|---|---|---|---|---|---|---|
| Ex. 1 | 80/20 | 1200 | 24 | ○ | Cristobalite | B |
| Ex. 2 | 80/20 | 1350 | 24 | ⊚ | Cristobalite | A |
| Comp. Ex. 1 | 80/20 | — | — | X | None | C |
| Comp. Ex. 2 | 80/20 | 750 | 1000 | ○ | None (amorphous) | D |

(Results)

It became clear from Table 1 that when a given heat treatment was applied to a fired body, the surfaces of the silicon carbide (SiC) particles and metallic silicon (Si) constituting the surface of a porous body to later contact with a catalyst could be covered with a crystalline coating film composed of cristobalite and the diffusion of potassium (K) could be suppressed effectively (Example 1). It became also clear also that by changing the conditions of heat treatment to further grow the crystalline coating film and sufficiently cover the surface of the porous body to later contact with the catalyst, the diffusion of potassium (K) could be suppressed more effectively (Example 2).

INDUSTRIAL APPLICABILITY

As described above, in the silicon carbide-based catalytic body of the present invention, the catalyst is loaded via a crystalline coating film comprising an oxide and formed on at least part of the silicon carbide particles constituting a first bonded structure; therefore, a catalyst such as NO$_x$ occlusion catalyst or the like, loaded on the present catalytic body can maintain its activity over a long period.

Also in the silicon carbide-based catalytic body of the present invention, the catalyst is loaded via a crystalline coating film composed of an oxide and formed on at least part of the silicon carbide particles and/or metallic silicon, constituting a second bonded structure; therefore, a catalyst such as $NO_x$ occlusion catalyst or the like, loaded on the present catalytic body can maintain its activity over a long period.

According to the process of the present invention for producing a silicon carbide-based catalytic body, since the process employs given production steps and given production conditions, there can be easily produced a catalytic body in which a catalyst is loaded via a crystalline coating film composed of an oxide and formed on at least part of the surfaces of silicon carbide particles and/or metallic silicon, forming a given bonded structure.

The invention claimed is:

1. A silicon carbide-based catalytic body comprising:
a porous body of given shape comprising a first bonded structure formed by bonding a large number of silicon carbide particles as an aggregate to each other in a state that a large number of fine pores are present; and
a catalyst containing an alkali metal and/or an alkaline earth metal, loaded on the porous body,
wherein the catalyst is loaded via a crystalline coating film comprising an oxide and formed on at least part of the surfaces of the silicon carbide particles forming the first bonded structure.

2. A silicon carbide-based catalytic body according to claim 1 wherein the crystalline coating film contains $SiO_2$.

3. A silicon carbide-based catalytic body according to claim 2, wherein the crystalline coating film comprises cristobalite and/or mullite.

4. A silicon carbide-based catalytic body according to claim 1, wherein the given shape of the porous body is a honeycomb shape.

5. A silicon carbide-based catalytic body comprising:
a porous body of given shape comprising a second bonded structure formed by bonding a large number of silicon carbide particles as an aggregate and metallic silicon as a binder in a state that a large number of fine pores are present; and
a catalyst containing an alkali metal and/or an alkaline earth metal, loaded on the porous body,
wherein the catalyst is loaded via a crystalline coating film comprising an oxide and formed on at least part of the surfaces of the silicon carbide particles and/or the metallic silicon, forming the second bonded structure.

6. A silicon carbide-based catalytic body according to claim 5, wherein the crystalline coating film contains $SiO_2$.

7. A silicon carbide-based catalytic body according to claim 6, wherein the crystalline coating film comprises cristobalite and/or mullite.

8. A silicon carbide-based catalytic body according to claim 5, wherein the given shape of the porous body is a honeycomb shape.

9. A process for producing a silicon carbide-based catalytic body, the process comprising:
forming a raw material mixture containing silicon carbide particles and metallic silicon into a formed body of a given shape;
calcinating and firing the formed body;
heat treating the formed body in an oxygen-containing atmosphere; and then
loading, on the formed body, a catalyst containing an alkali metal and/or an alkaline earth metal,
to obtain a catalytic body comprising:
a porous body comprising a second bonded structure formed by bonding a large number of the silicon carbide particles and the metallic silicon in a state that a large number of fine pores are present; and
the catalyst loaded on the porous body via a crystalline coating film comprising an oxide and formed on at least part of the surfaces of the silicon carbide particles and/or the metallic silicon, forming the second bonded structure.

10. A process for producing a silicon carbide-based catalytic body according to claim 9, wherein the heat treatment is conducted at a temperature of 800 to 1,400° C.

11. A process for producing a silicon carbide-based catalytic body according to claim 9, wherein the given shape is a honeycomb shape.

* * * * *